(12) United States Patent
Warberg Block et al.

(10) Patent No.: US 11,058,109 B1
(45) Date of Patent: Jul. 13, 2021

(54) PEST-REPELLENT PALLET SLIP SHEETS

(71) Applicant: EarthKind, LLC, Bismarck, ND (US)

(72) Inventors: Kari G. Warberg Block, Bismarck, ND (US); John P. Foster, Westminster, CO (US)

(73) Assignee: EarthKind, LLC, Mooresville, NC (US)

( * ) Notice: Subject to any disclaimer, the term of this patent is extended or adjusted under 35 U.S.C. 154(b) by 0 days.

(21) Appl. No.: 16/785,185

(22) Filed: Feb. 7, 2020

(51) Int. Cl.
*A01N 25/00* (2006.01)
*A01N 25/10* (2006.01)

(52) U.S. Cl.
CPC .................................. *A01N 25/10* (2013.01)

(58) Field of Classification Search
USPC ........................................................ 442/327
See application file for complete search history.

(56) References Cited

U.S. PATENT DOCUMENTS

| | | |
|---|---|---|
| 1,199,508 A | 9/1916 | Swift |
| 3,139,217 A | 6/1964 | Mell |
| 3,791,346 A | 2/1974 | Willinger |
| 3,936,339 A | 2/1976 | Lock |
| 4,157,696 A | 6/1979 | Carlberg |
| 4,735,803 A | 4/1988 | Katz |
| 4,775,532 A | 10/1988 | Clayton |
| 4,853,413 A | 8/1989 | Katz |
| 4,940,583 A | 7/1990 | Thompson |
| 4,961,929 A | 10/1990 | Gurvich |
| 5,183,661 A | 2/1993 | Messina |
| 5,242,111 A | 9/1993 | Nakoneczny |
| 5,344,649 A | 9/1994 | Mungia |
| 5,356,881 A | 10/1994 | Verbiscar |
| 5,364,626 A | 11/1994 | Hasegawa |
| 5,372,429 A | 12/1994 | Beaver, Jr. |

(Continued)

FOREIGN PATENT DOCUMENTS

| | | | |
|---|---|---|---|
| JP | 2016053223 A | * | 4/2016 |
| JP | 2016053223 A | | 4/2016 |

(Continued)

OTHER PUBLICATIONS

Machine translation of JP2016053223 (Year: 2016).*
PCT Search Report and Written Opinion for PCT/US2020/17452; Received May 8, 2020.

*Primary Examiner* — Vincent Tatesure
(74) *Attorney, Agent, or Firm* — Neustel Law Offices

(57) ABSTRACT

Pest-repellent pallet slip sheets for preventing or reducing rodent or pest damage to goods placed on pallets or other locations. The pest-repellent pallet slip sheets generally include slip sheets designed for placement on the top portion of a pallet, such that the slip sheet covers substantially the entire pallet. The slip sheets may be treated with repellent substance all over, randomly, or in a pattern such that a specific portion, or all, of the slip sheet is treated with the pest-repellent substance. The pattern may be produced, for example, by feeding slip sheet material past an application device at a given rate of speed, and then intermittently interrupting the application of the pest-repellent substance if an intermittent pattern is desired. A colored dye may be added to the pest-repellent substance to create a visible indication of a pattern or treated area.

1 Claim, 19 Drawing Sheets

(56) References Cited

U.S. PATENT DOCUMENTS

| | | | |
|---|---|---|---|
| 5,554,649 A * | 9/1996 | Ishiwatari | A01N 53/00 |
| | | | 514/530 |
| 5,571,522 A | 11/1996 | Munson | |
| 5,674,496 A | 10/1997 | Etscorn | |
| 5,690,964 A | 11/1997 | Hill | |
| 5,714,445 A | 2/1998 | Trinh | |
| 5,798,385 A | 8/1998 | Marin | |
| 6,337,081 B1 | 1/2002 | Warberg | |
| 2003/0108700 A1 | 6/2003 | Krech | |
| 2006/0257441 A1 | 11/2006 | Kmoai et al. | |
| 2009/0011279 A1 | 1/2009 | Wisenbaker, Jr. | |
| 2009/0142528 A1 | 6/2009 | Tilton | |
| 2009/0155560 A1 | 6/2009 | Lefebvre | |
| 2013/0158128 A1 | 6/2013 | Topolkaraev | |
| 2014/0262016 A1 | 9/2014 | Combs | |

FOREIGN PATENT DOCUMENTS

| | | | |
|---|---|---|---|
| KR | 20170119696 A | 10/2017 | |
| WO | 2005090177 A1 | 9/2005 | |

\* cited by examiner

PEST-REPELLENT PALLET SLIP SHEETS

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to pest-repellent pallet slip sheets for protecting products from rodent and pest damage while the products are on pallets, or elsewhere.

Related Art

Any discussion of the related art throughout the specification should in no way be considered as an admission that such related art is widely known or forms part of common general knowledge in the field.

In the past, entire pallets have been chemically treated to make them resistant to damage from rot and insects, for example. However, such treated pallets do not provide a physical barrier to pests such as rodents, insects, arthropods, etc., and may be expensive, especially considering that pallets are often reused, and treated pallets may be necessary or desirable for some products, but not others. In addition, untreated slip sheets may be useful for shipment and handling of some products, but may not adequately protect food, perishables, or other products from rodents and other pests.

SUMMARY

An example embodiment is directed to pest-repellent pallet slip sheets. The pests targeted may be rodents, arthropods, or other pests, and the repellent material can be targeted to one or more types of these pests. The pest-repellent pallet slip sheets include a slip sheet sized for placement on a top portion of a pallet, such that the slip sheet covers all or a part of the top portion of the pallet; and a pest-repellent substance applied to the slip sheet in a pattern such that a patterned portion of the slip sheet is treated with the pest-repellent substance.

In example embodiments, the slip sheet may be made from paper, corrugated paper, cardboard, plant fibers, or hemp fibers, etc. Further, the pattern in which the substance is applied may cover less than the entire slip sheet, and may include, for example, an X-shaped pattern, or a box shape around a perimeter of the slip sheet, in embodiments wherein the slip sheet is rectangular. Further, the patterned portion may comprise a plurality of gaps that are not treated with the pest-repellent substance, such that a pattern similar to a wide dashed line is produced. This pattern may be produced, for example, by feeding slip sheet material past an application device at a given rate of speed, and then intermittently interrupting the application of the pest-repellent substance.

A colored dye may be added to the pest-repellent substance to ensure a visible pattern is created, although the substance itself may also create discoloration that is visible after the substance dries. In addition, paint or sealant may also be applied over or under the repellent to provide performance benefits.

In addition to dye or colorant in the repellent substance (or the coloring properties of the substance itself), additional labeling, printing, painting, or other forms of marking may be used to indicate the repellent properties of the slip sheets, and also to provide instructions, directions, manufacturer attribution, lot coding, warnings, or other information relevant to the slip sheets when in storage, transport, or use.

In a further example embodiment, the slip sheet may be rectangular and have four corners, and the pattern may include the four corners, such as a square pattern at each corner. As an example, the pattern may cover about 6-10 square inches at one or more corners of the slip sheet. In still another example, the slip sheet is rectangular, and the pattern may comprise two opposite edges of the slip sheet. Alternatively, a pest-repellent pallet slip sheet may comprise a slip sheet that is rectangular, and wherein the pattern comprises two treated portions perpendicular to each other. In some cases, each of the two treated portions may be parallel to the sides of the slip sheet, forming a cross-shaped pattern.

In some embodiments of the pest-repellent pallet slip sheet the pattern covers less than 100% of the slip sheet, and it may cover less than 50% of the slip sheet, or it may alternatively cover less than 20% or less than 10% of the slip sheet.

The pest-repellent pallet slip sheet may be made by the steps of calibrating an application means (such as a roller, similar to a paint roller, or a low-volume, high-pressure sprayer) to deliver a pest-repellent substance at a specific rate, and feeding slip sheet material past the application means at a feed rate corresponding to the specific rate such that a target application rate is achieved; and applying the pest-repellent substance to the slip sheet material with the application means.

As with other example embodiments, pest-repellent pallet slip sheets made using this method may be made from paper, corrugated paper, cardboard, plant fibers, hemp fibers, or other suitable materials. Further, the application means may comprise a roller or a sprayer or other device suitable for delivering a pest-repellent substance to a product or surface.

Moreover, instead of moving slip sheet material past an application means or device, the means or device may be moved over or past the slip sheet material, so that the process may resemble a paint process with a stationary, or slow-moving paint target. The process may be used to deliver a controlled volume of oil or other repellent substance to the slip sheet material by calibrating the application means to deliver the pest-repellent substance at a specific rate, and using the application means to apply the pest-repellent substance to the slip sheet material at the specific rate.

There has thus been outlined, rather broadly, some of the embodiments of the pest-repellent pallet slip sheets in order that the detailed description thereof may be better understood, and in order that the present contribution to the art may be better appreciated. There are additional embodiments of the pest-repellent pallet slip sheets that will be described hereinafter and that will form the subject matter of the claims appended hereto. In this respect, before explaining at least one embodiment of the pest-repellent pallet slip sheets in detail, it is to be understood that the pest-repellent pallet slip sheets are not limited in its application to the details of construction or to the arrangements of the components set forth in the following description or illustrated in the drawings. The pest-repellent pallet slip sheets are capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1A:
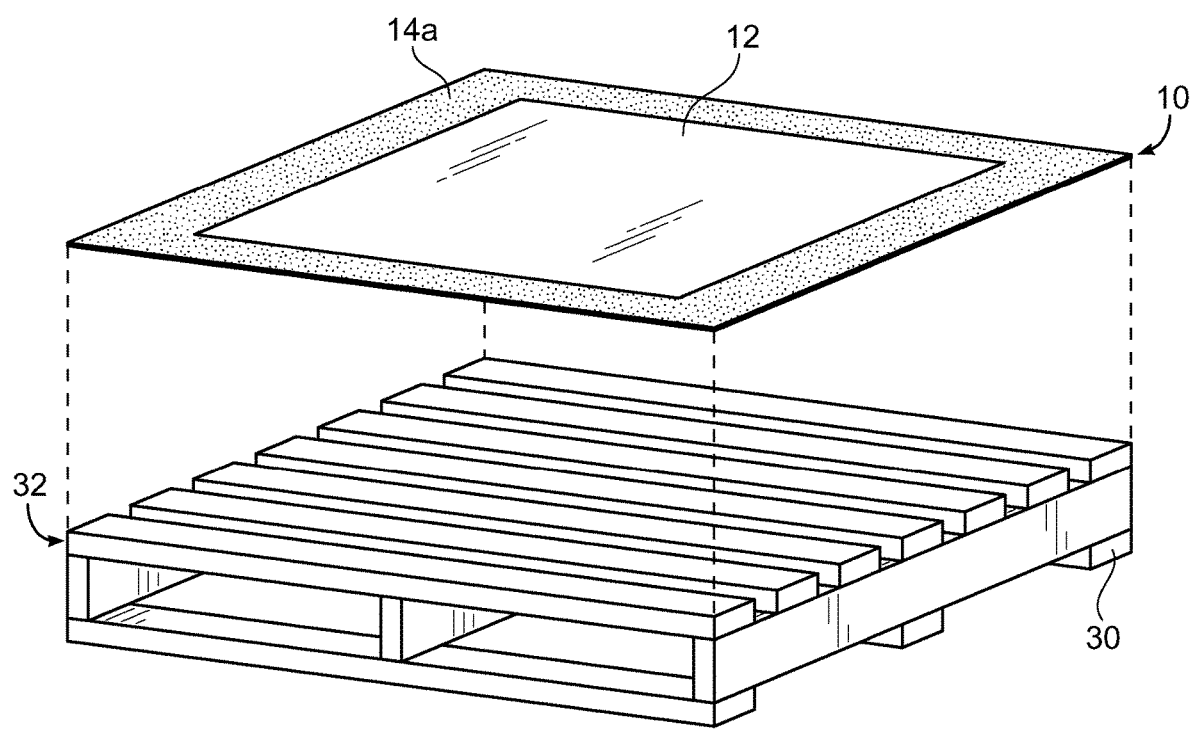
FIG. 1A is an exploded, perspective view of a pest-repellent pallet slip sheet and a pallet in accordance with an example embodiment.

A. Overview.

Pallet slip sheets 12 treated with a pest-repellent substance 20 may provide useful protection of products 34 placed on pallets 30, where the products 34 are subject to damage and consumption by insects and/or rodents. Pallet slip sheets 12 are typically in the form of thin sheets made from paper, cardboard, plant fibers, corrugated paper, etc. Such slip sheets are thin enough that they do not limit the amount of product that can be place on pallets, but they do provide a physical barrier. For example, if the top of a pallet 30 is comprised of parallel wood slats, slip sheets 10 will provide a physical barrier that prevents rodents or other pests from moving freely from the floor to the perishable product between the slats.

In addition to providing a physical barrier, slip sheets 12 can be treated with pest-repellent substance (such as pest-repellent oil) to further protect products on pallets 30. A number of pest-repellent oils and substances are available that repel rodents and other small animals by irritating their respiratory systems, or that the pests otherwise avoid, while at the same time providing a safe, pleasant scent to humans.

By way of non-limiting example, pest-repellent pallet slip sheets 10 may be made by infusing, coating, or treating slip sheet material with repellant oils to create repellant slip sheets.

Example pest-repellent pallet slip sheets 10 generally comprise a slip sheet 12 treated with a pest-repellent substance 20 in a pattern, a random area, or on an entire slip sheet. The substance 20 may comprise oil or any pest-repellent substance or chemical, which may generally be in liquid form before application to untreated slip sheets 12. Each slip sheet 12 is sized for placement on a top portion 32 of a pallet 30, such that the pest-repellent pallet slip sheet 10 covers substantially the entire top portion 32 of the pallet 30. A patterned portion 14 of the slip sheet 12 is treated with the pest-repellent substance 20 to create a pest-repellent slip sheet 10.

In example embodiments, the slip sheet material may be made from paper, corrugated paper, cardboard, plant fibers, or hemp fibers, etc. Further, the pattern in which the substance 20 is applied may cover less than the entire slip sheet 12, and may include, for example, an X-shaped pattern, or a box shape around a perimeter of the slip sheet, in embodiments wherein the slip sheet 12 is rectangular. Further, the patterned portion 14 may comprise a plurality of gaps that are not treated with the pest-repellent substance 20, such that a pattern similar to a wide dashed line is produced.

Such a pattern may be produced, for example, by feeding slip sheet material past an application device such as a sprayer 40 or roller 42 at a given rate of speed, and then intermittently interrupting the application of the pest-repellent substance 20. The patterned portion 14 may cover less than 100% of the slip sheet 12, and it may cover less than 50% of the slip sheet, or it may alternatively cover less than 20% or less than 10% of the slip sheet, depending on the pattern used, which saves on the amount of treating substance 20 used (and accordingly, lowers the cost of the product), while still providing the pest resistance needed.

In a further example embodiment, the slip sheets 10 may be rectangular and have four corners, and the patterned portion 14 may include the four corners, such as a square pattern at each corner. In still another example, the slip sheet 10 may be rectangular, and the pattern may comprise two opposite edges of the slip sheet. Alternatively, a pest-repellent pallet slip sheet 10 may comprise a slip sheet 12 that is rectangular, and the pattern may comprise two treated portions 14 that are perpendicular to each other. In some cases, each of the two treated portions may be parallel to the sides of the slip sheet, forming a cross-shaped patterned portion 14.

B. Treated Slip Sheets.

Example embodiments of pest-repellent slip sheets 10 generally comprise slip sheets 12 that are treated with pest-repellent substance in a pattern, to create a patterned portion 14 on the slip sheet. Such example embodiments of the final product, treated slip sheets 10, are best shown in FIGS. 1-4 and 9-14. As can be seen from the figures, the pest-repellent patterns can vary, and will generally result in less than 100% of the slip sheet 12 being treated with the pest-repellent substance 20. In some embodiments, such as that of FIGS. 1-4 and 9-14, less than 50% of the base slip sheet 12 is covered, and the coverage may comprise less than 20%, or less than 10% coverage in the illustrated, or other, embodiments. This allows a smaller quantity of pest-repellent substance 20 to be used, which is still effective for the purpose of repelling rodents and other pests, while the cost of the slip sheets 10 is accordingly reduced. The coverage may typically range from 5% to 100%.

Figure 1B:
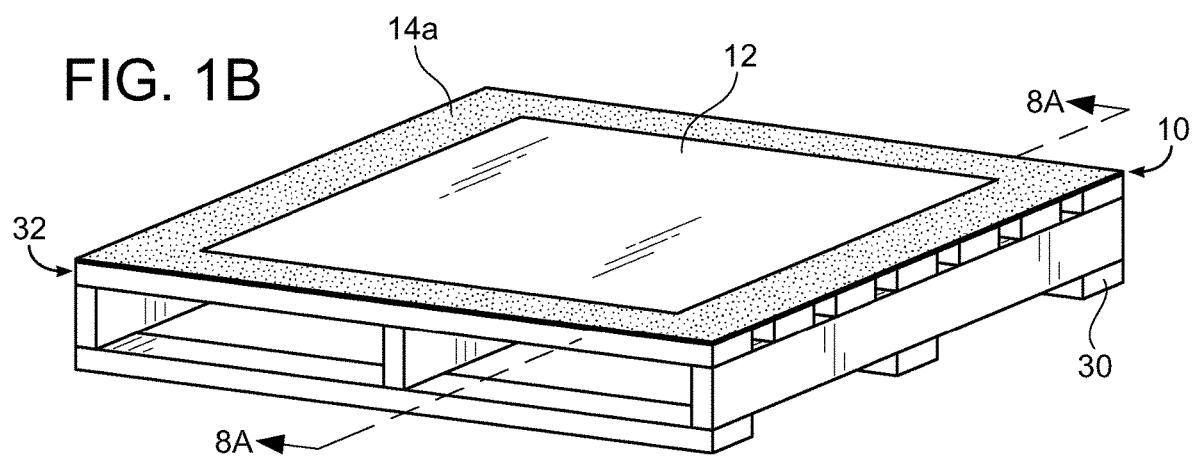
FIG. 1B is a perspective view of a pest-repellent pallet slip sheet on a pallet in accordance with an example embodiment.
Figure 1C:
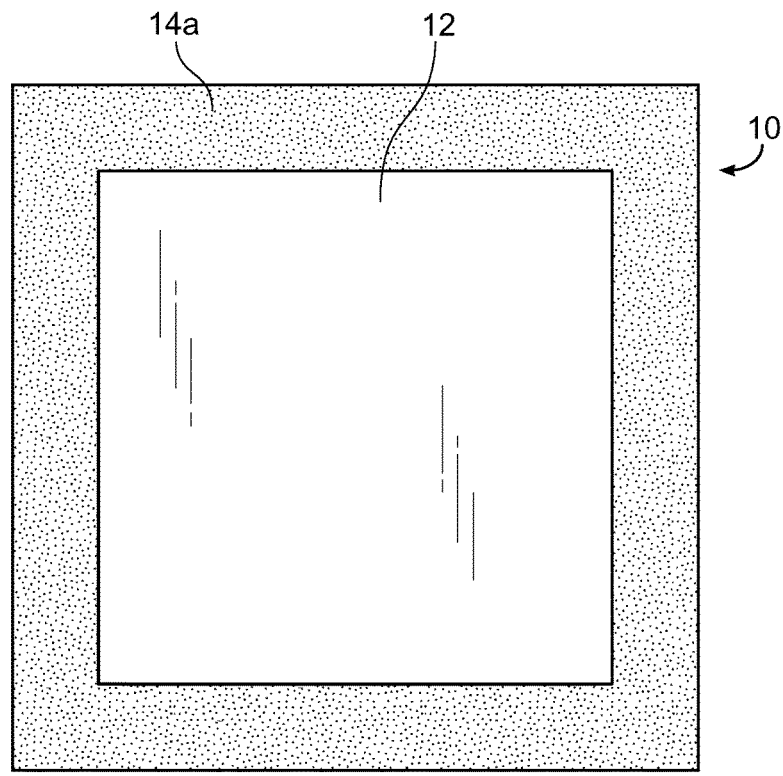
FIG. 1C is a top view of a pest-repellent pallet slip sheet in accordance with an example embodiment.
Figure 2:
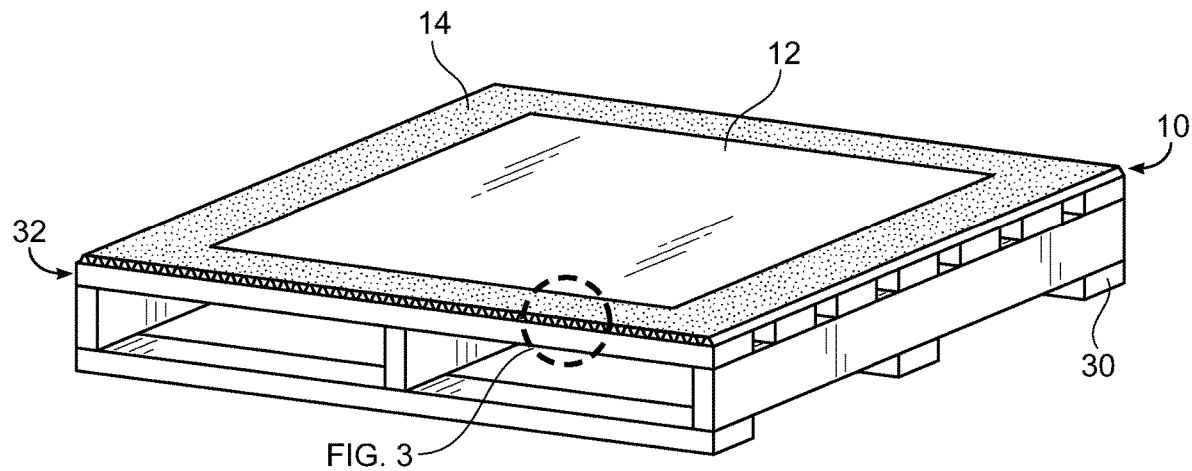
FIG. 2 is a perspective view of another pest-repellent pallet slip sheet in accordance with an example embodiment.
Figure 3:
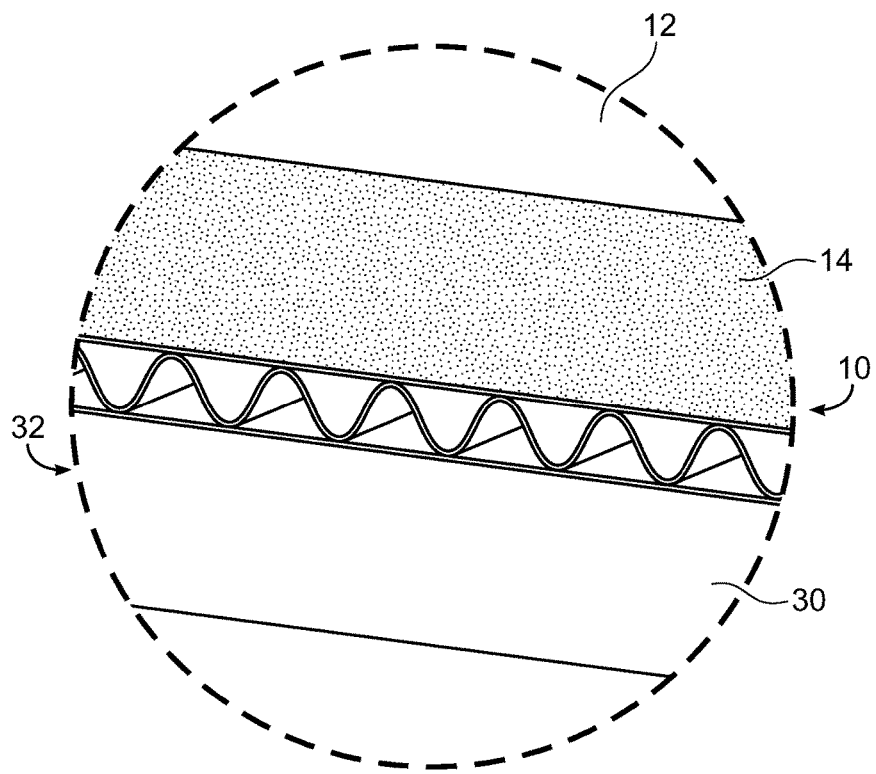
FIG. 3 is a detail view of a pest-repellent pallet slip sheet in accordance with an example embodiment.
Figure 4:
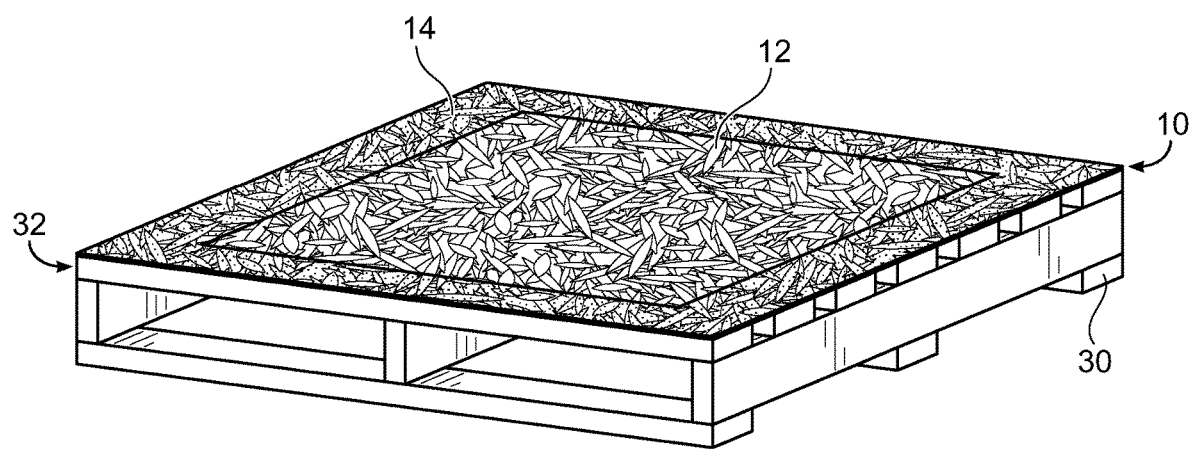
FIG. 4 is a perspective view of another pest-repellent pallet slip sheet in accordance with an example embodiment.

As discussed previously, the slip sheet material can be of many types. For example, FIG. 1 illustrates a slip sheet 10 made from paper, while FIGS. 2 and 3 illustrate slip sheets 10 made from corrugated cardboard or paper, and plant fibers, respectively. The plant fiber material may comprise hemp fiber, by way of non-limiting example.

FIGS. 1-14 illustrate the slip sheets 10 sized and cut to fit on standard pallets 30, although other sizes and shapes may be used, and indeed the slip sheets 10 may be used in other applications as well, including applications where the sheets are used without a pallet, to provide a physical and substance-based deterrent to rodents and other pests. FIGS. 1A and 1B best illustrate the size and shape of the slip sheets 10, and how they are made to fit on pallets 30.

In the figures, the patterned portion 14 generally represents the treated portion of the slip sheets 10, which is typically visible. However, in some embodiments, the treated portion may be less visible, although it is likely, and may even be desirable, for the pattern to remain visible after infusion or application of the substance 20, so that a user knows the slip sheet is pest repellent. The pattern may also serve a decorative purpose, or act as a source indicator. A colored dye may be added to the pest-repellent substance in order to ensure that the patterned portion 14 is visible, which allows quick and easy confirmation that the sheets are pest-resistant, and also to confirm the shape of the pattern and the coverage amount or adequacy. In addition, paint or sealant may also be applied over or under the repellent to provide performance benefits.

C. Treatment Patterns.

As mentioned, different patterns may be used in applying pest-repellent substance 20 to the slip sheets. FIGS. 1A-1C show a pattern on a rectangular slip sheet 10, the pattern creating a patterned portion 14a comprising a box shape around the perimeter of the slip sheet 10. This pattern may effectively repel rodents or other creatures attempting to climb or jump onto pallets at the edges, while at the same time minimizing the amount of pest-repellent substance 20 used in making the sheet 10. As shown, this pattern leaves an untreated, generally rectangular portion of slip sheet material in the central portion of the slip sheet material. This pattern may also comprise bands or strips of treated portions that are the same or generally the same width along each edge of the slip sheet 10, and the treated portion may extend all the way to each edge of the slip sheet 10. However, different widths along different edges of the slip sheet 10 are also possible.

Figure 9A:
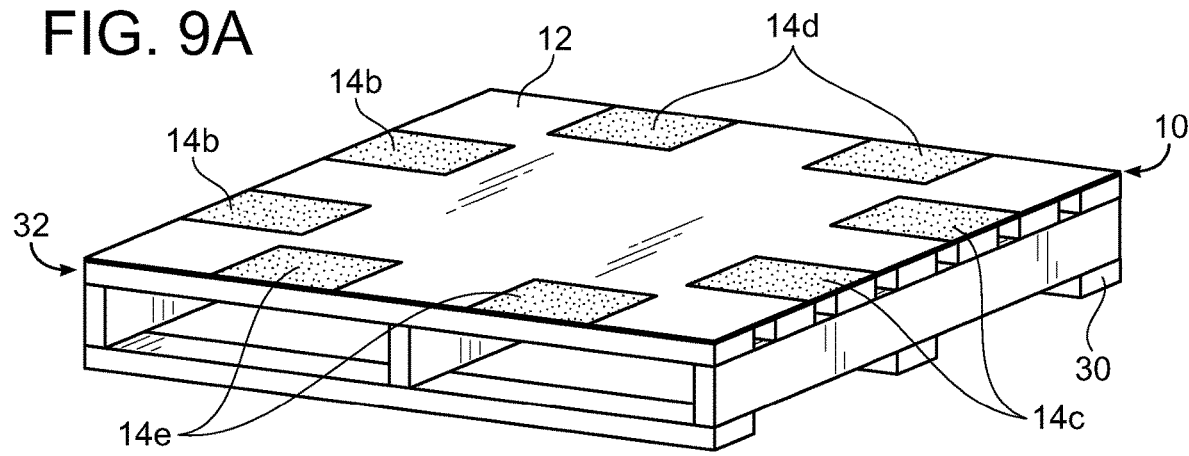
FIG. 9A is a perspective view of another pest-repellent pallet slip sheet in accordance with an example embodiment.
Figure 9B:
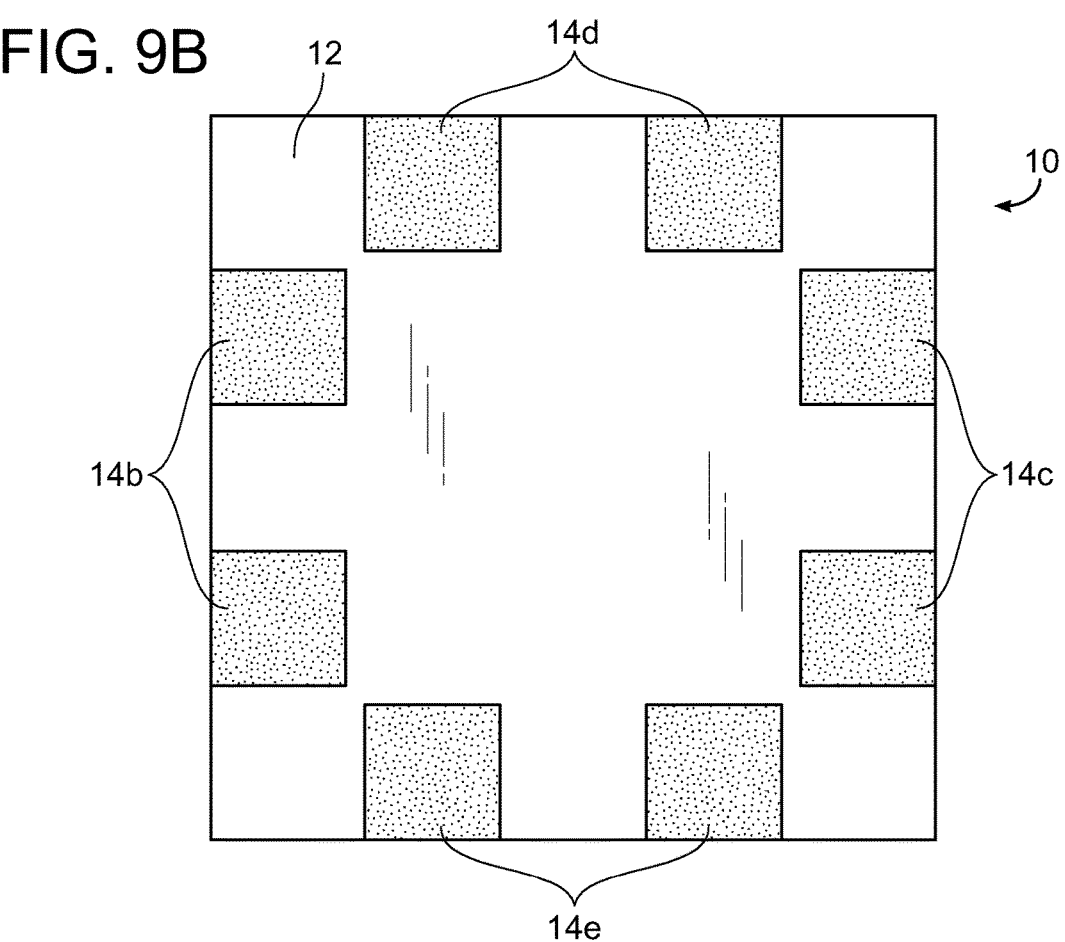
FIG. 9B is a top view of another pest-repellent pallet slip sheet in accordance with an example embodiment.

Similarly, FIGS. 9A and 9B illustrate another example pattern, comprising patterned portions 14b-14d. As shown, the pattern is discontinuous, with portions 14b and 14c being disposed on opposite, generally parallel sides of a rectangular slip sheet 12, and portions 14e and 14d being disposed on the remaining two sides. The treated portions of this pattern may be substantially like those of the pattern of FIGS. 1A-1C, but with evenly or unevenly spaced discontinuities, resulting in square or rectangular treated portions along all four edges of slip sheet 10. As shown, this pattern also leaves an untreated, generally rectangular portion of slip sheet material in the central portion of the slip sheet 10. This pattern may also comprise bands or strips of treated portions that are the same or generally the same width along each edge of the slip sheet 10, and the treated portions may extend all the way to each edge of the slip sheet 10. As with the previous pattern, different widths of treated portions along different edges of the slip sheet 10 are also possible.

Figure 10A:
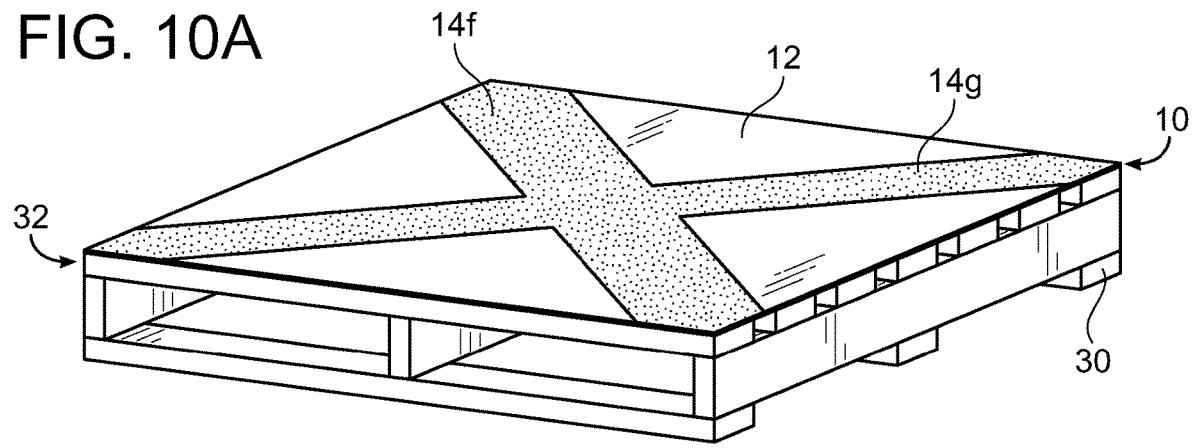
FIG. 10A is a perspective view of another pest-repellent pallet slip sheet in accordance with an example embodiment.
Figure 10B:
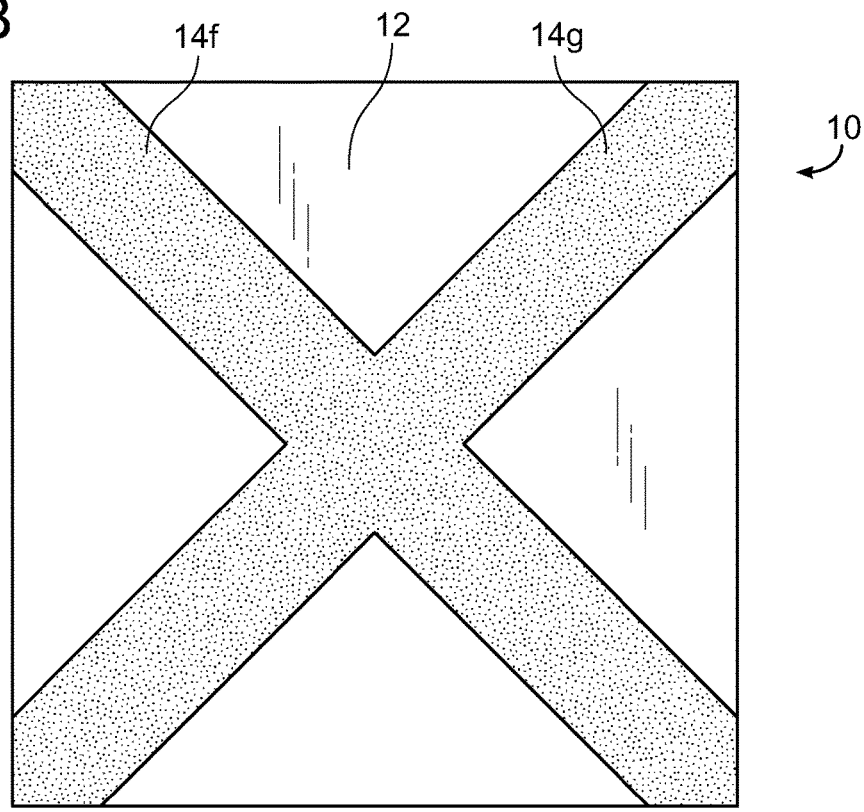
FIG. 10B is a top view of another pest-repellent pallet slip sheet in accordance with an example embodiment.

FIGS. 10A and 10B show another possible pattern, which is generally an X-shape comprising portions 14f and 14g. These portions may be perpendicular to each other, although they may alternatively be at different angles. As also shown, the portions 14f and 14g intersect or include the corners of the slip sheet 10. The treated portions of this pattern, 14f and 14g, may comprise equal width, linear bands or strips through the middle of the slip sheet 10, and may alternately comprise portions that are not of equal width. This pattern creates four triangular untreated portions of slip sheet 10, one at each edge of the slip sheet.

Figure 11A:
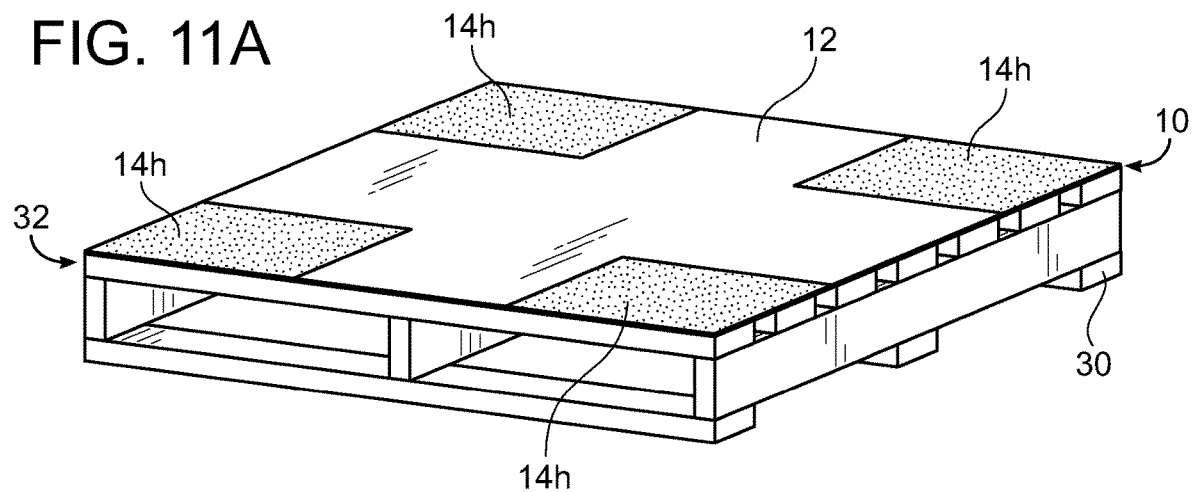
FIG. 11A is a perspective view of another pest-repellent pallet slip sheet in accordance with an example embodiment.
Figure 11B:
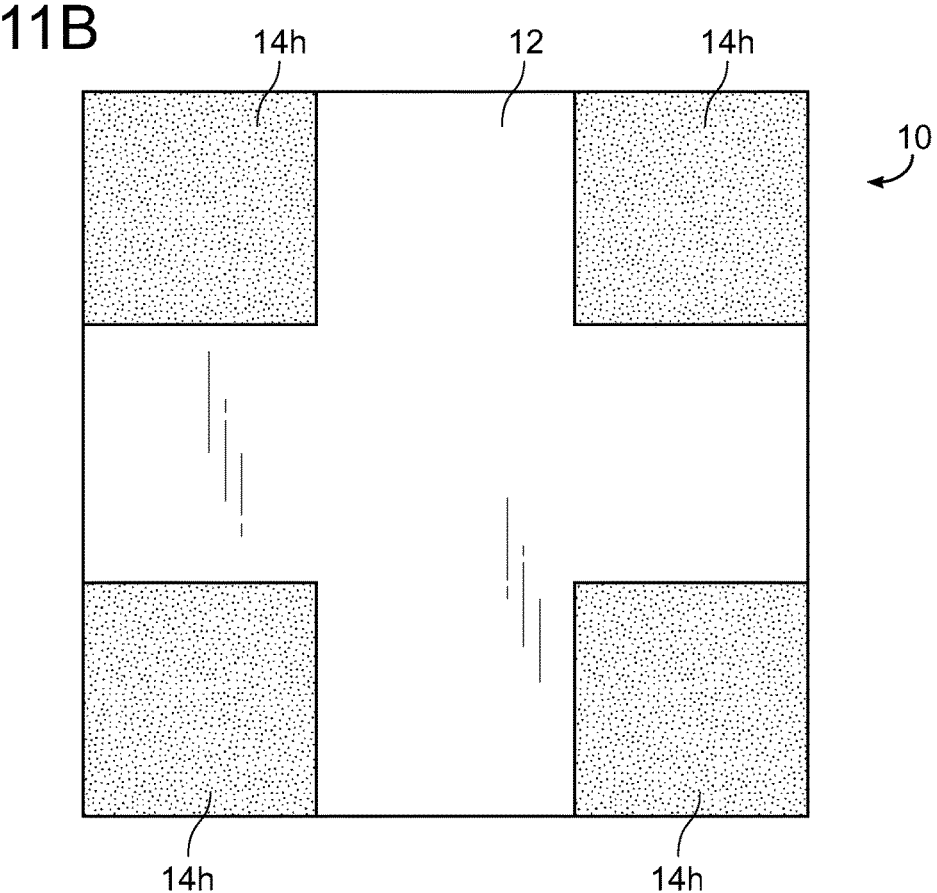
FIG. 11B is a top view of another pest-repellent pallet slip sheet in accordance with an example embodiment.

FIGS. 11A and 11B illustrate another example pattern, comprising patterned portions 14h. As shown, this pattern is also discontinuous, and comprises four rectangular or square treated areas, one at each corner of rectangular slip sheet 10. The rectangular portions 14h generally extend to the edge of the slip sheet 10 on two sides, and the treated sections may be different sizes from that shown in the figures. This pattern creates an untreated cross pattern centered on the slip sheet 10, the cross having sides that are generally parallel to the sides of slip sheet 10.

Figure 12A:
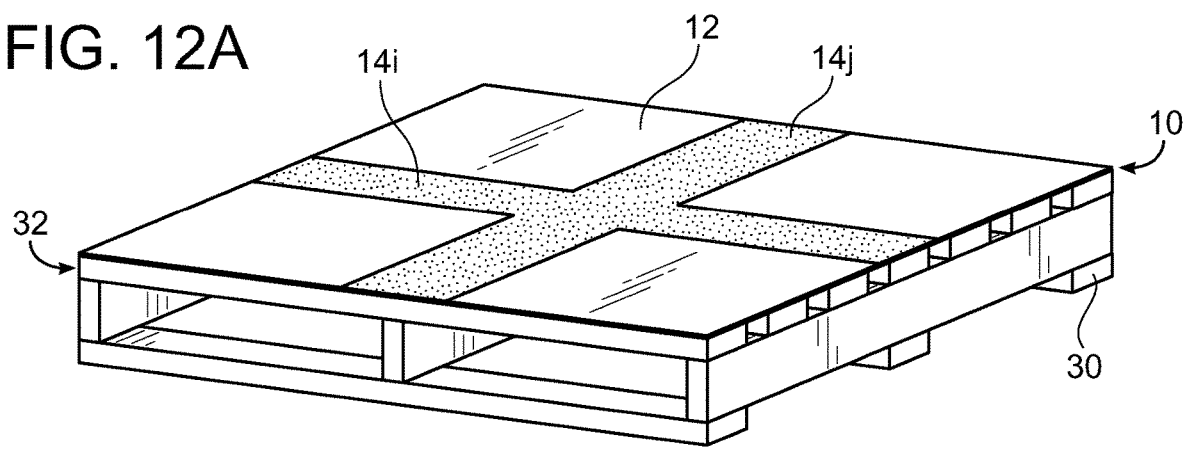
FIG. 12A is a perspective view of another pest-repellent pallet slip sheet in accordance with an example embodiment.
Figure 12B:
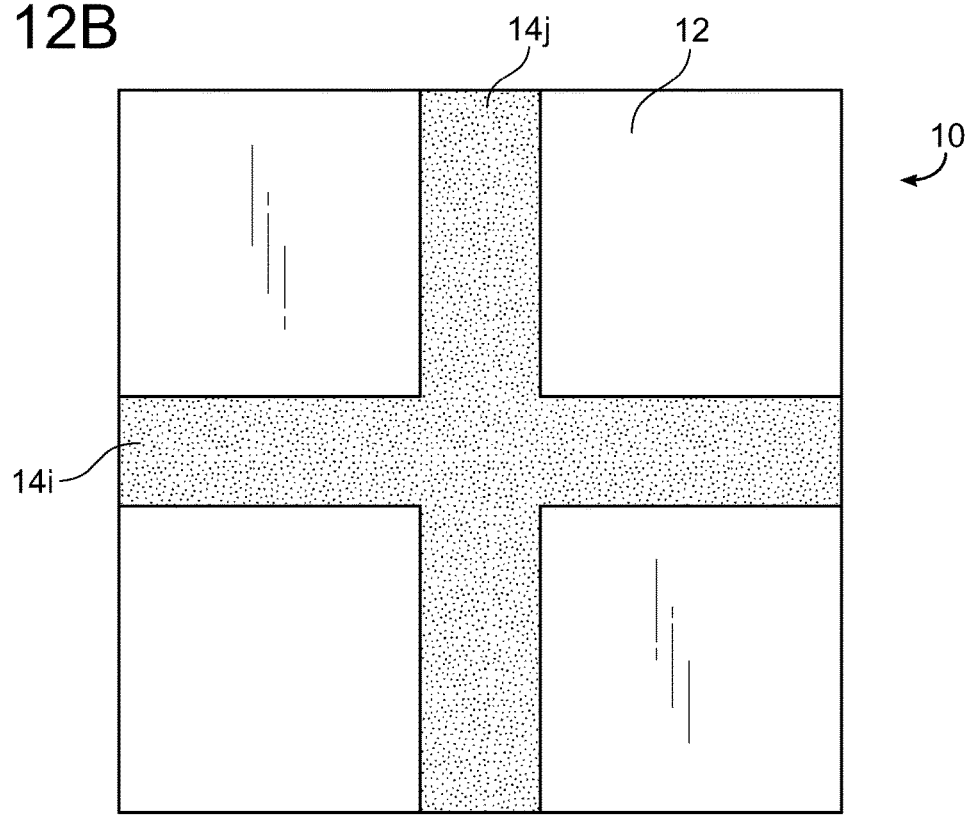
FIG. 12B is a top view of another pest-repellent pallet slip sheet in accordance with an example embodiment.

Another possible treatment pattern is shown in FIGS. 12A and 12B, and in this pattern, the portions 14i and 14j are generally parallel, linear bands or strips of treated portions that are also parallel to the sides of the slip sheet, passing through its center. This pattern creates four rectangular or square areas in the corners of the slip sheet 10, with the treated portion generally extending all the way across the slip sheet 10.

Figure 13A:
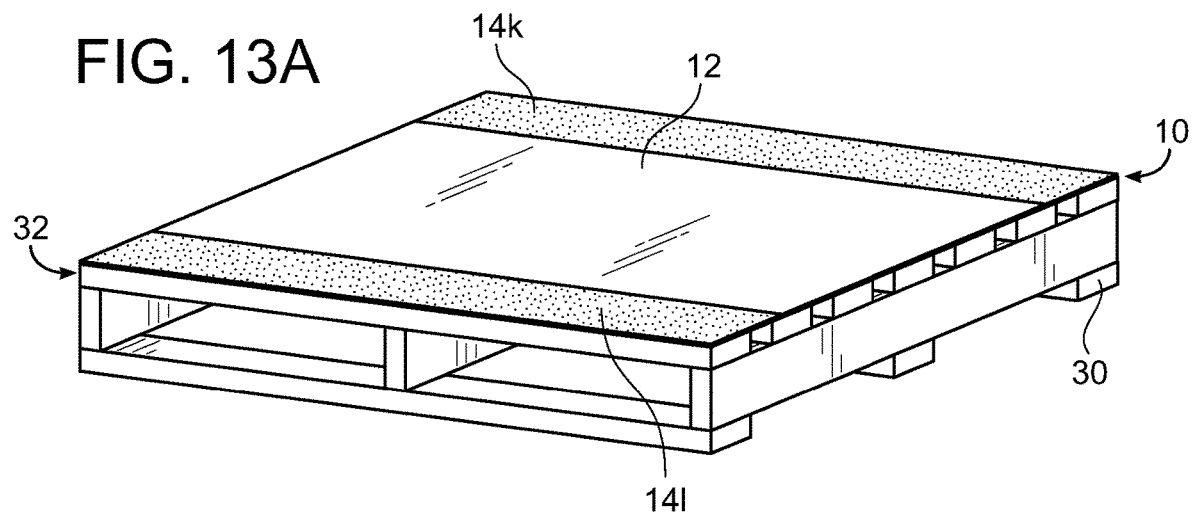
FIG. 13A is a perspective view of another pest-repellent pallet slip sheet in accordance with an example embodiment.
Figure 13B:
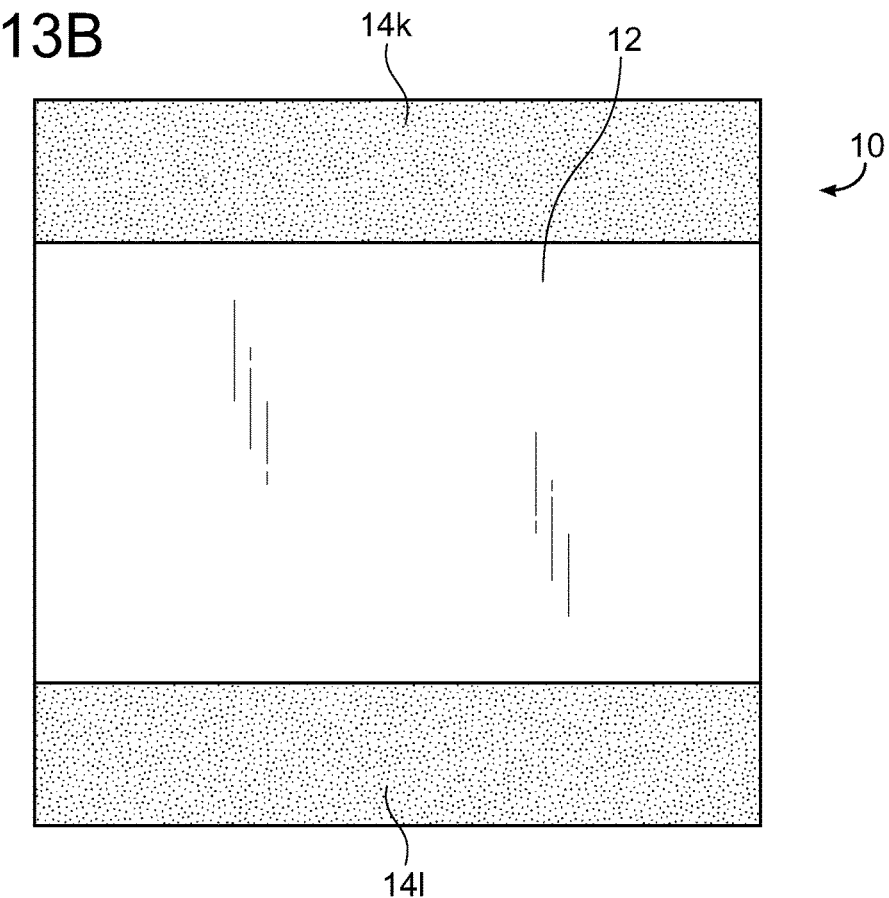
FIG. 13B is a top view of another pest-repellent pallet slip sheet in accordance with an example embodiment.

FIGS. 13A and 13B illustrate a pattern comprising two generally parallel treated portions 14k and 14l, which are placed along the edges of slip sheet 10 on opposite sides. As shown, the treated portions comprise linear bands or strips along two opposite edges of the slip sheet 10, which is rectangular or square in this example embodiment. The treated portions 14k and 14l may be wider or narrower than shown in FIGS. 13A and 13B. This pattern creates a rectangular untreated portion of slip sheet 12 in a central portion of the slip sheet 10, which extends generally from one side of the sheet to the opposite side. This pattern may be particularly useful for its ease of production if slip sheet material in the form of a continuous roll is fed past an application device, as discussed below. This pattern is also useful in that it creates a continuous pest-repellent area along an entire edge of the slip sheet 10.

Figure 14A:
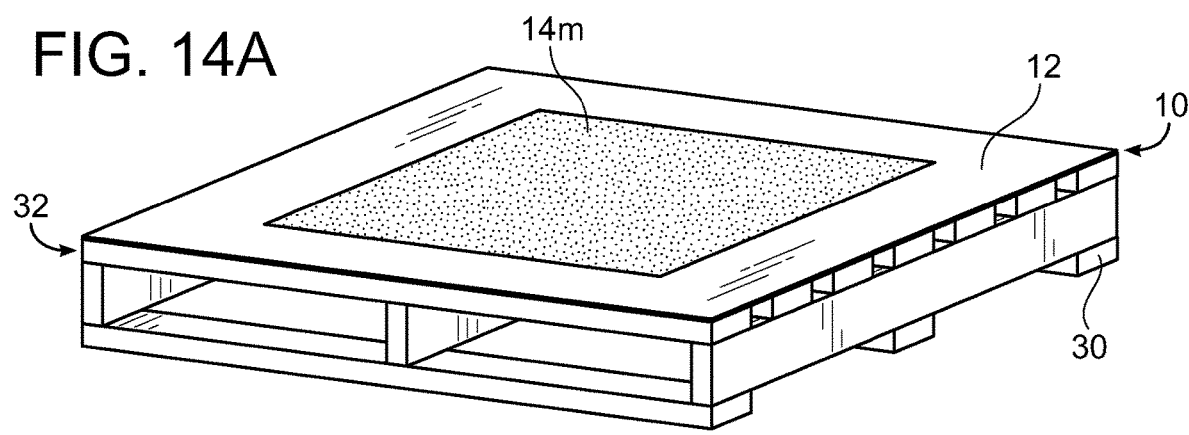
FIG. 14A is a perspective view of another pest-repellent pallet slip sheet in accordance with an example embodiment.
Figure 14B:
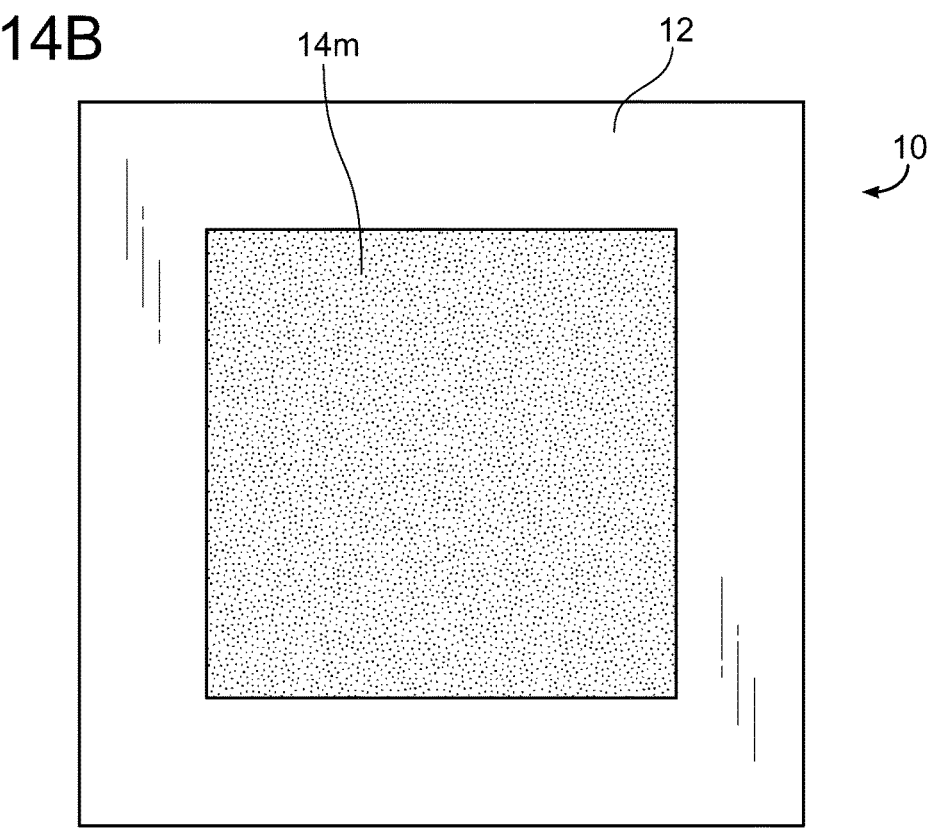
FIG. 14B is a top view of another pest-repellent pallet slip sheet in accordance with an example embodiment.

FIGS. 14A and 14B illustrate an example embodiment with a patterned, treated portion 14m in the central part of slip sheet 10, which pattern may be generally aligned with the sides of a rectangular slip sheet 10 as shown. As can be seen, this pattern is in the shape of a square or rectangular section, which creates untreated bands of slip sheet material along the edges, with the bands being generally parallel along opposite edges of the slip sheets. As with other patterns, this pattern may be readily produced with an applicator applying the pest-repellent substance 20 to a continuous roll of material before it is cut, as generally illustrated in FIGS. 15-18.

In addition to being applied in defined patterns, pest-repellent substance 20 may also be applied in other ways, such as to cover or be infused over the entire slip sheet (as show, for example, in FIGS. 15-18), or alternatively, substance 20 may be applied randomly to slip sheets or slip sheet material before it is cut to a particular shape.

D. Pest-Repellent Substance.

The example pest-repellent pallet slip sheets 10 may be made by treating or infusing slip sheet material with one or more pest-repellent substances, including oils and other substances, which may generally be in liquid form prior to treatment of pallets. The pest-repellent substance may be comprised of any substance that repels animals and pests such as, but not limited to, insects (e.g. ants, flies, susa etc.), worms, rodents (e.g. mice, rats, etc.), birds and/or other types of animals. By way of non-limiting example, some such substances may comprise oils or other substances/chemicals. The unfinished slip sheets may either be infused with a repellent substance, or alternatively, may be coated with it (or, the treatment may result in the substance being infused and coated in varying degrees), such that the substance is on a surface of the final slip sheet. Further, as discussed herein, any repellent substance or chemical, not just oil, may be used to treat the slip sheets 12.

Figure 8A:
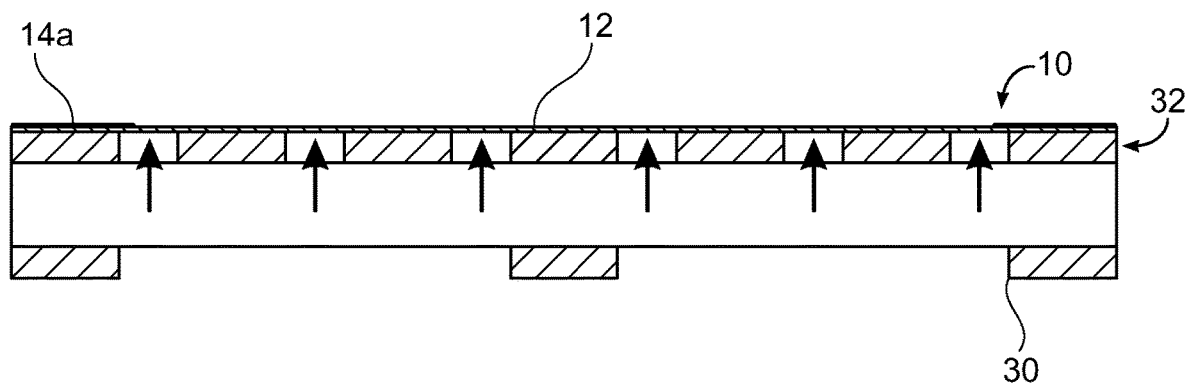
FIG. 8A is a sectional view of a pest-repellent pallet slip sheet taken at line 8-8 of FIG. 1, in accordance with an example embodiment.
Figure 8B:
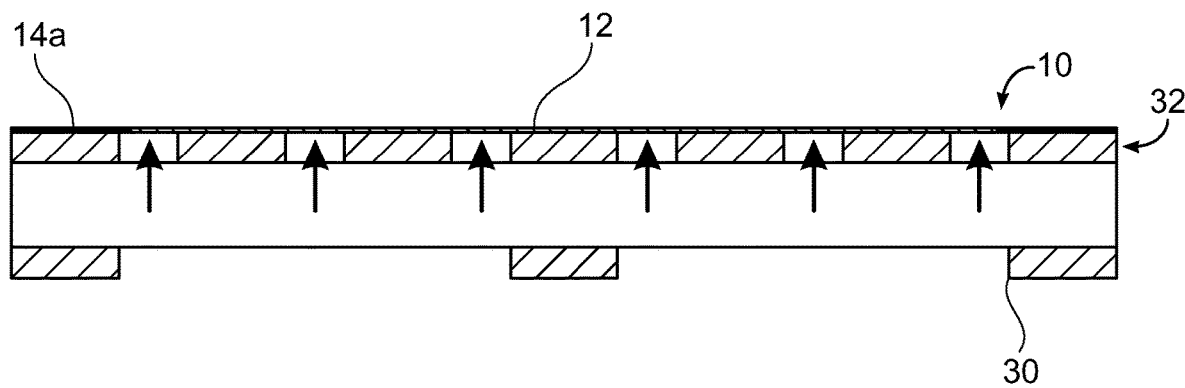
FIG. 8B is a sectional view of another pest-repellent pallet slip sheet taken at line 8-8 of FIG. 1, in accordance with an example embodiment.

FIG. 8A illustrates a slip sheet with pest-repellent substance 20 coated or treated mainly on the surface of slip sheet 12, while FIG. 8B is an illustration of an infused slip sheet, wherein the pest-repellent substance 20 has penetrated into the slip sheet 12 and is infused below the surface. Notably, the patterned portions of treated slip sheet material illustrated in the figures can represent either a surface treated slip sheet 10 or one wherein the substance 20 is infused.

As discussed in U.S. Pat. No. 6,337,081, which is hereby incorporated by reference, various oils are used to treat or infuse slip sheets for pest-repellent properties, In addition, well as other oils, chemicals, or substances not mentioned here may be used.

E. Making Preferred Embodiments.

The pest-repellent slip sheets 10 may be made by infusing, coating, or applying onto untreated slip sheets or material 12 the pest-repellent substance 20, which may be scented, colored with dye, or both, in addition to its pest repelling properties. Further, the application of substance 20 may be accomplished in any of several ways. For example, it may be done as the sheets are manufactured or afterwards, either in rolls or individual sheets, and it may be done with an automated process, in high volumes, as shown in FIGS. 15-18, or it may be done manually.

Figure 15:
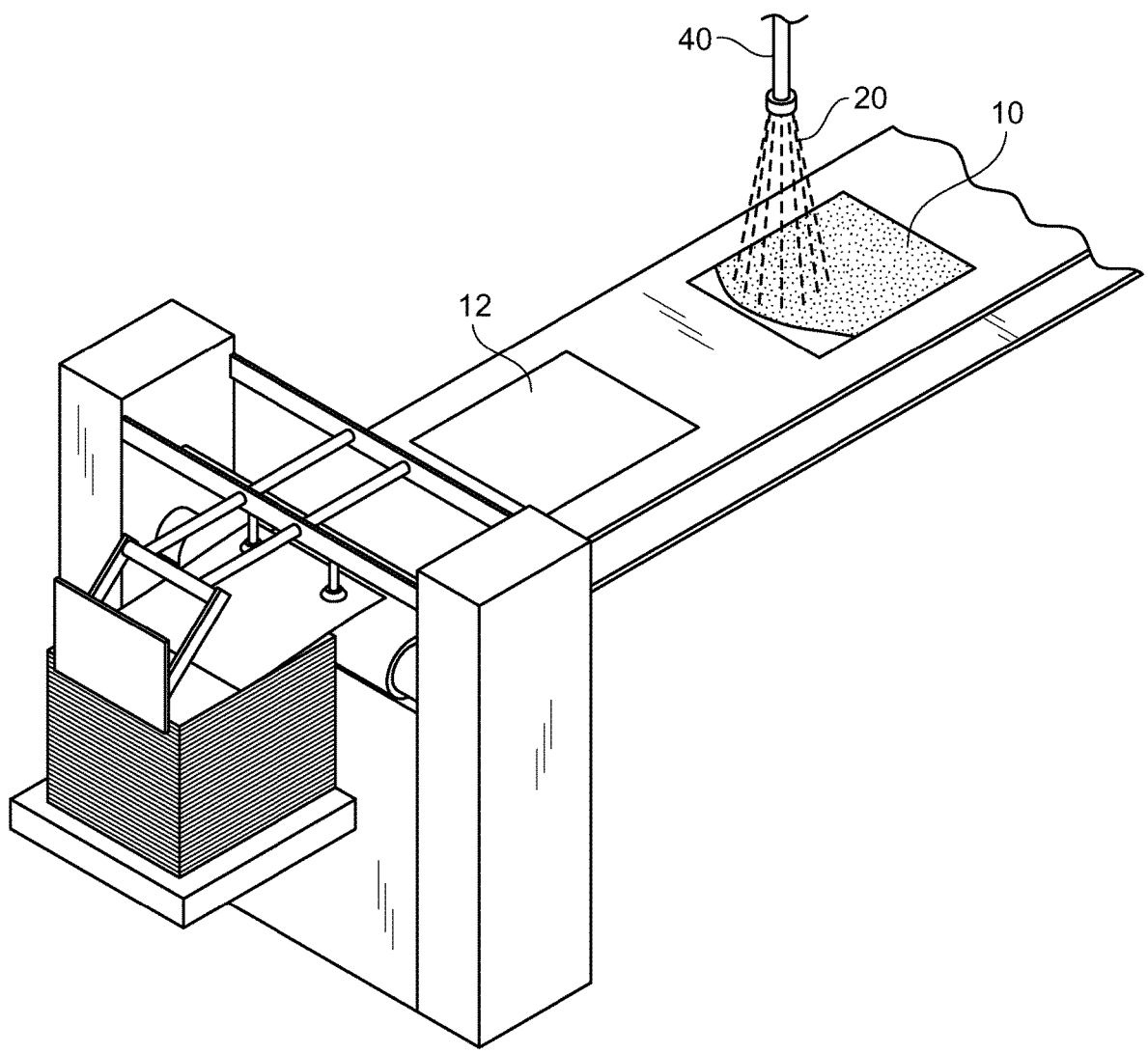
FIG. 15 is a perspective view of pallet slip sheets being treated in accordance with an example embodiment.
Figure 16:
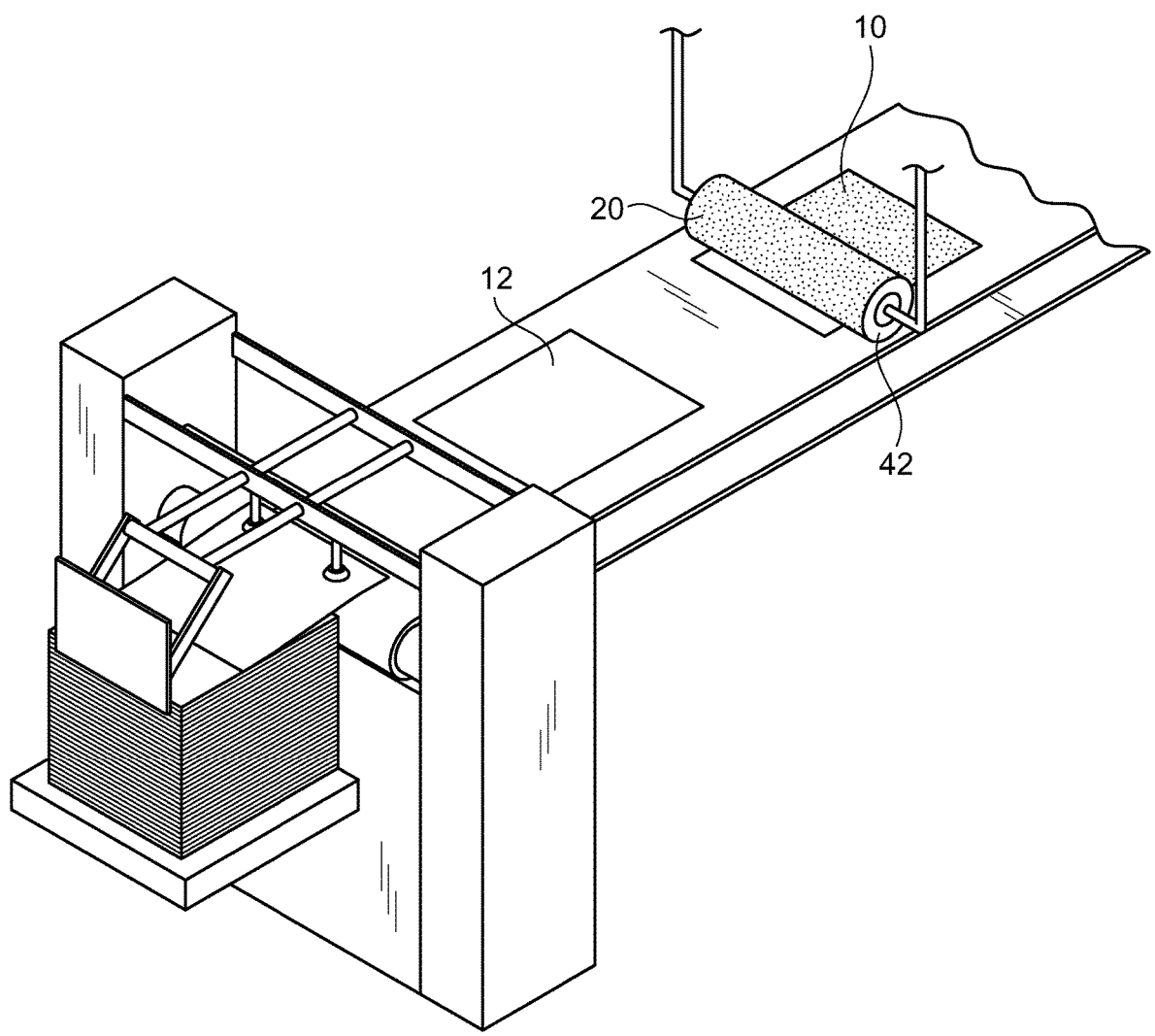
FIG. 16 is another perspective view of pallet slip sheets being treated in accordance with an example embodiment.
Figure 17:
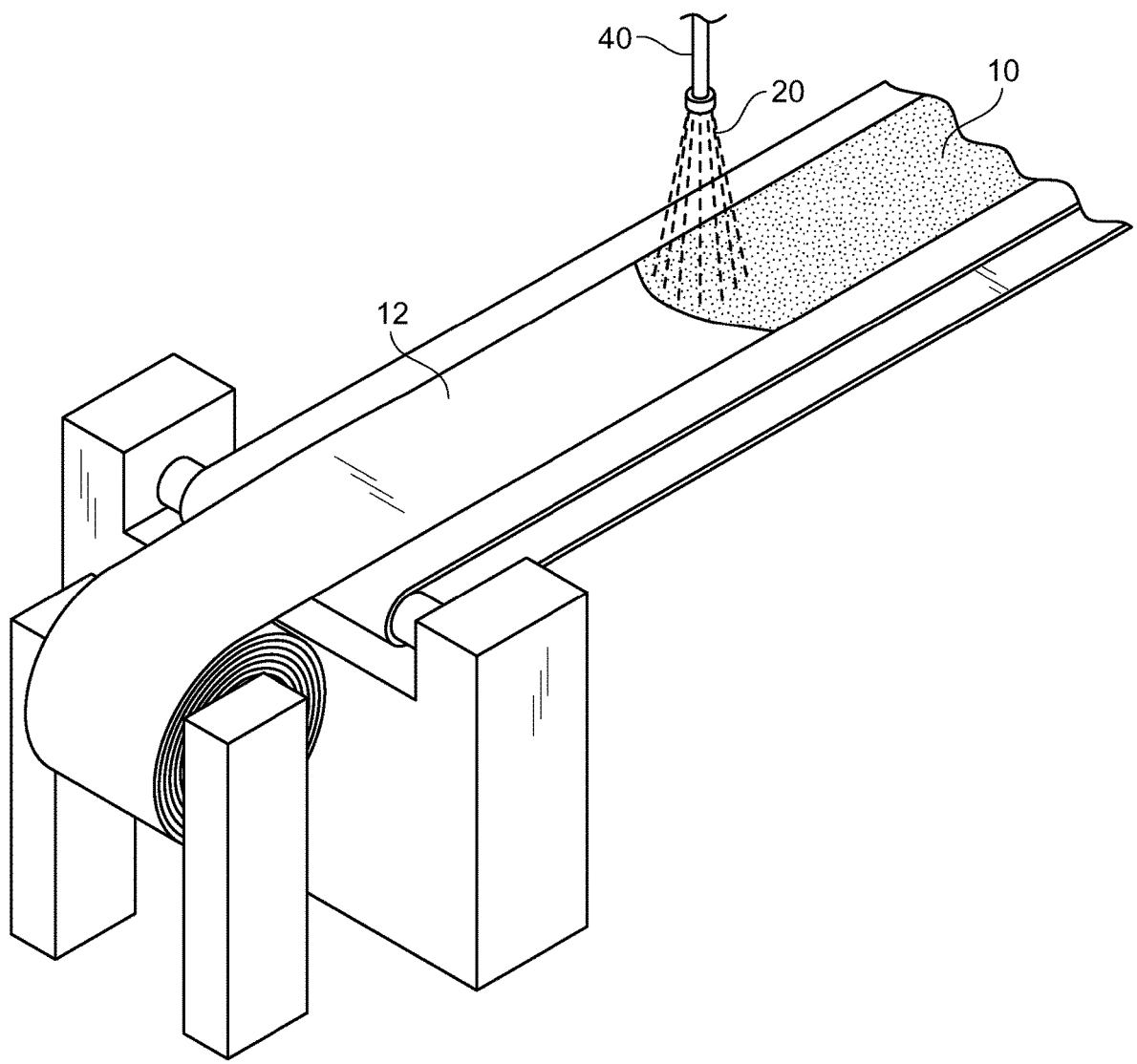
FIG. 17 is a perspective view of pallet slip sheet material being treated in accordance with an example embodiment.
Figure 18:
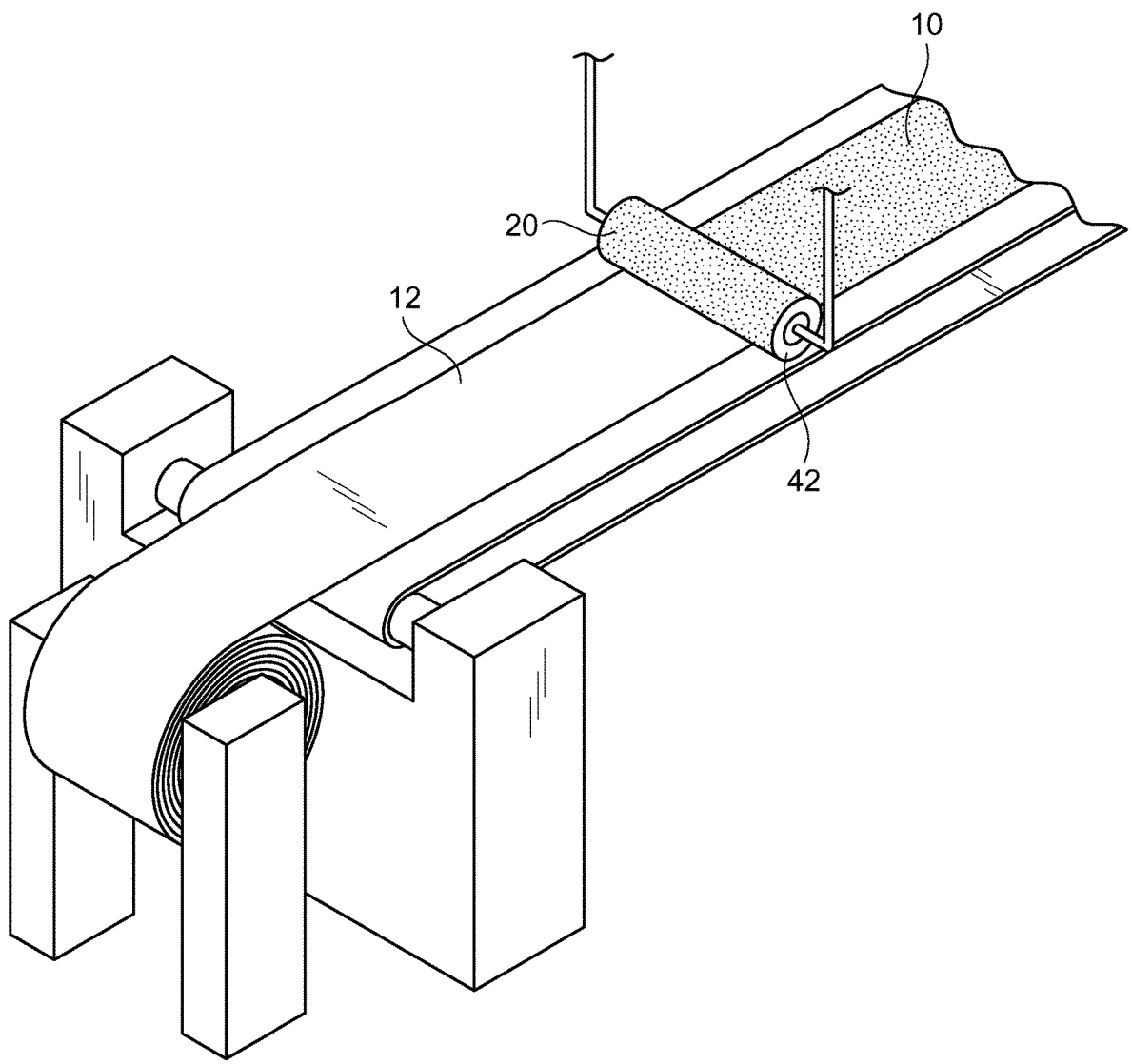
FIG. 18 is a perspective view of pallet slip sheet material being treated in accordance with an example embodiment.

As shown in FIGS. 15-18, the slip sheet material, in either a continuous roll form, or as sheets fed by a sheet feeder, may be moved past an application device, such as a high-pressure, low-volume sprayer 40, or a roller 42. In addition to the repellent application device, another applicator, which may be different, similar or identical to 40 or 42, can be used in front of or behind application device 40 or 42 to apply paint or sealant under or over the repellent. In addition to being applied in the same pattern as the repellent substance, paint or sealant may also be applied in a different pattern, or at a different time. Such paint or sealant may provide performance benefits to the repellant. FIG. 15 illustrates treatment of sheets 12 using a sprayer 40, while FIG. 16 shows the use of a roller 42, with pest-repellent substance 20 on its surface. Similarly, FIGS. 17 and 18 illustrate the treatment of a roll of slip sheet material 12 with a sprayer 40 and a roller 42, respectively.

To create a desired pattern, the flow of the pest-repellent substance 20, or the position of the application device may be changed or interrupted, such that the patterned portions 14 shown in FIGS. 1-3 and 9-14, as well as other patterns, may be created.

Figure 19:
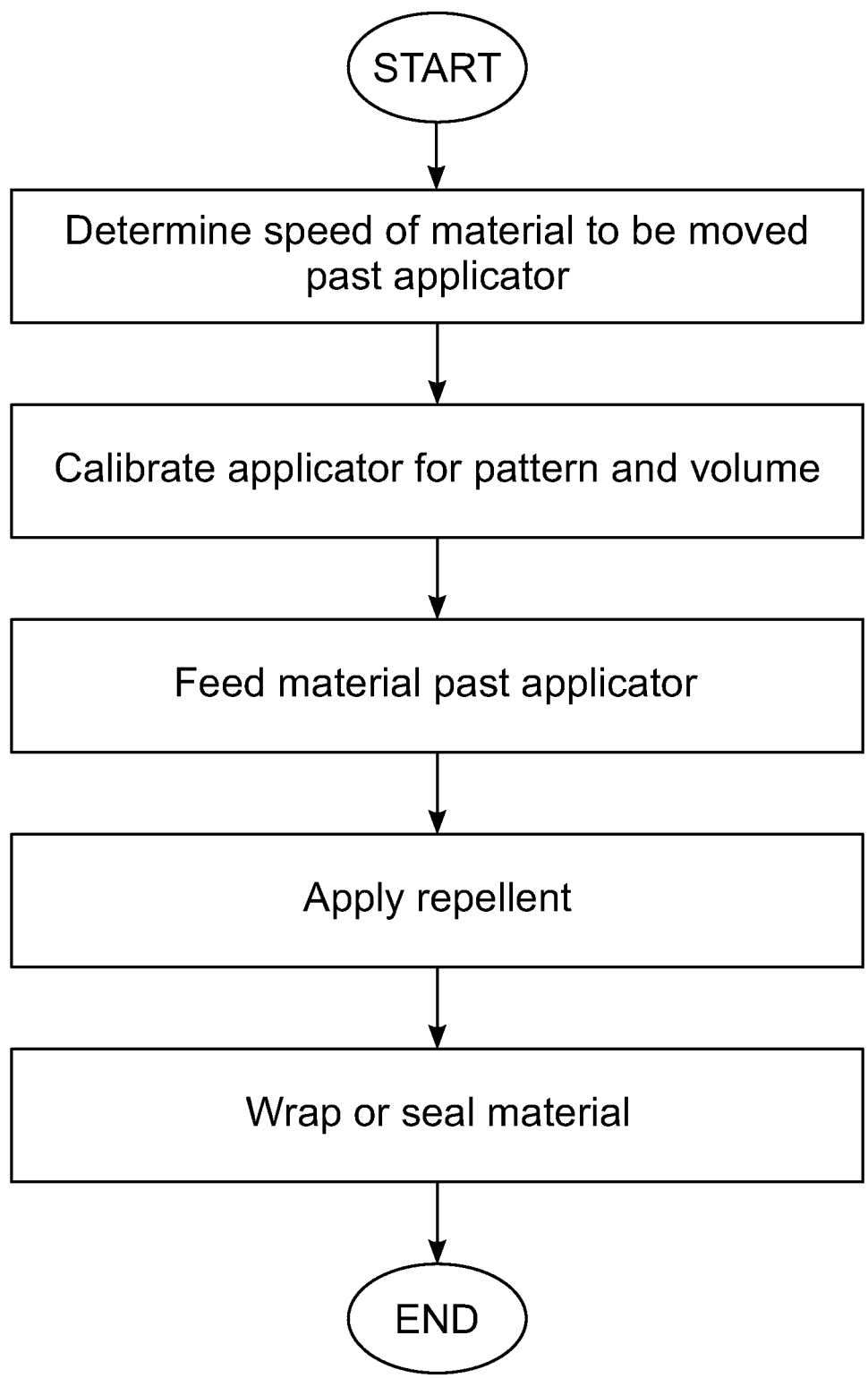
FIG. 19 is a flow chart broadly outlining an example process of making pest-repellent pallet slip sheets in accordance with an example embodiment.

FIG. 19 broadly outlines the steps that may be used in producing pest-repellent slip sheets. As noted, the volume of applied substance 20 can be controlled so that a desired strength is achieved. To accomplish this, the speed at which the raw slip sheet material will be fed or moved past the applicator 40 or 42 will be set or noted. Instead of moving material past an applicator, in some example processes, an application device may be moved relative to a stationary sheet or sheet material, similar to a robotic automobile painting process.

Once the relative feed speed is known, the application device can be set to deliver the substance 20 at a specific rate and pattern. For example, if a sprayer 40 is to be used, the flow rate when the sprayer is "on" may be set, as well as the on/off pattern, if one is used. As an example, for the dashed pattern of FIGS. 9A and 9B, the sprayer 40 (or roller 42) can be turned on and off (or raised, if a roller is used) to create the patterned portions 14, as shown. Note that more than one sprayer 40 or roller 42 may also be used.

It should be noted that the infusion, coating, or other treatment of slip sheets 12 can be done during manufacturing (e.g., while the material is on the roll), or it may also be done after the sheets have been cut from the roll. Once the pest-repellent substance 20 has been applied, especially if it is done during manufacturing, the product should be packaged and sealed.

F. Using Preferred Embodiments.

Figure 5:
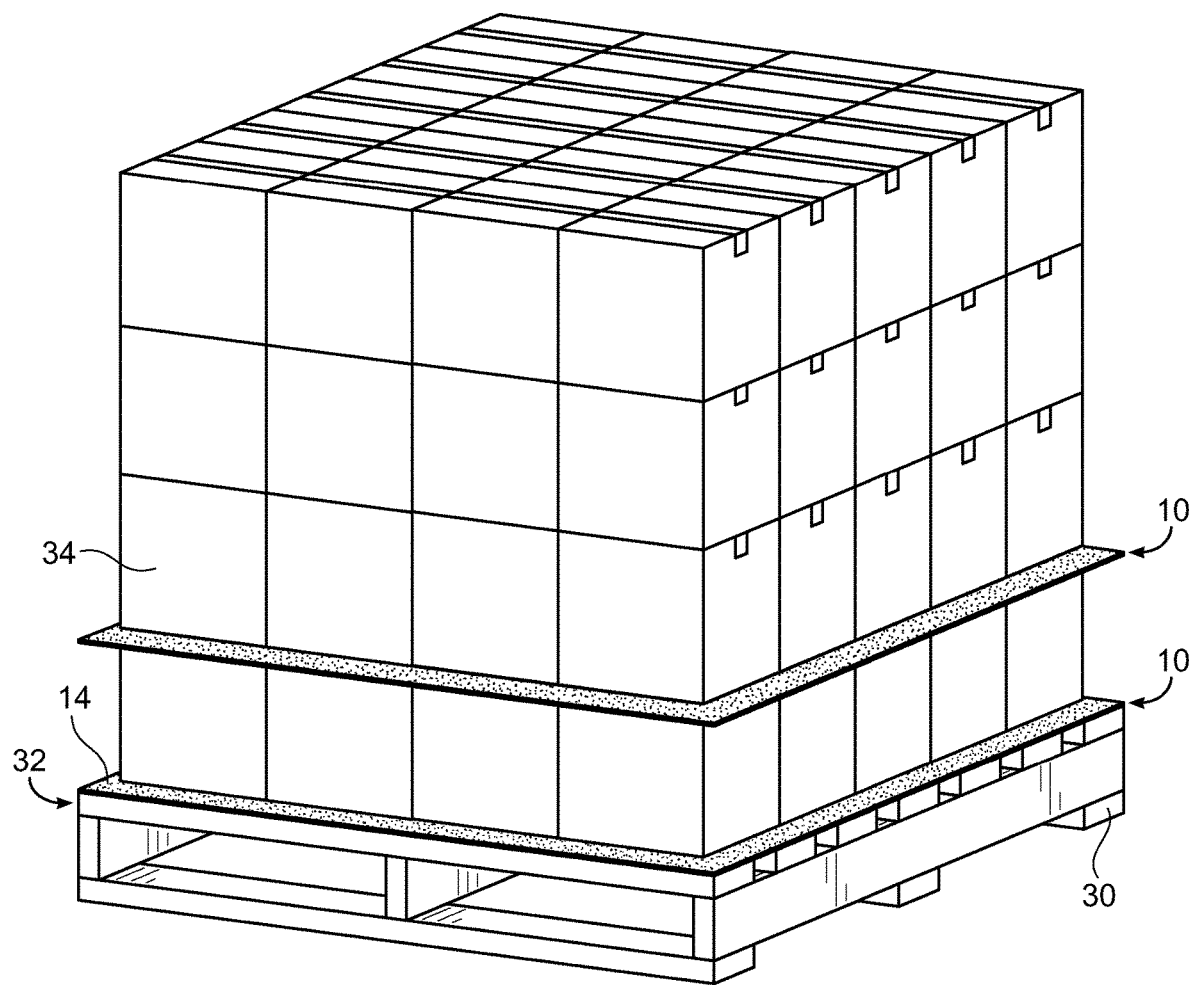
FIG. 5 is a perspective view of a pest-repellent pallet slip sheet in use, in accordance with an example embodiment.

In use, the pest-repellent slip sheets 10 will be in place on the top portion 32 of one or more pallets 30, as shown, for example, in FIGS. 1A and 1B. Typically, pallets 30 may have perishable or edible products 34 resting on them, with slip sheets 10 acting as a physical and repellent barrier to rodents and other pests, as shown in FIGS. 5-8. FIGS. 8A and 8B illustrate how the slip sheets provide a physical barrier (indicated by arrows) between the wooden slats of pallet 30, to prevent or discourage animals from climbing, crawling, or jumping onto the pallet 30 and reaching any product 34 on the pallet. As shown in FIG. 5, additional slip sheets 10 can also be placed between layers of products; the figure shows a slip sheet 10 between the pallet and the first level of product, and also another slip sheet 10 between the first level of products and the second. Of course, additional slip sheets 10 can also be placed between other levels or layers of products to provide the needed protection.

Figure 6:
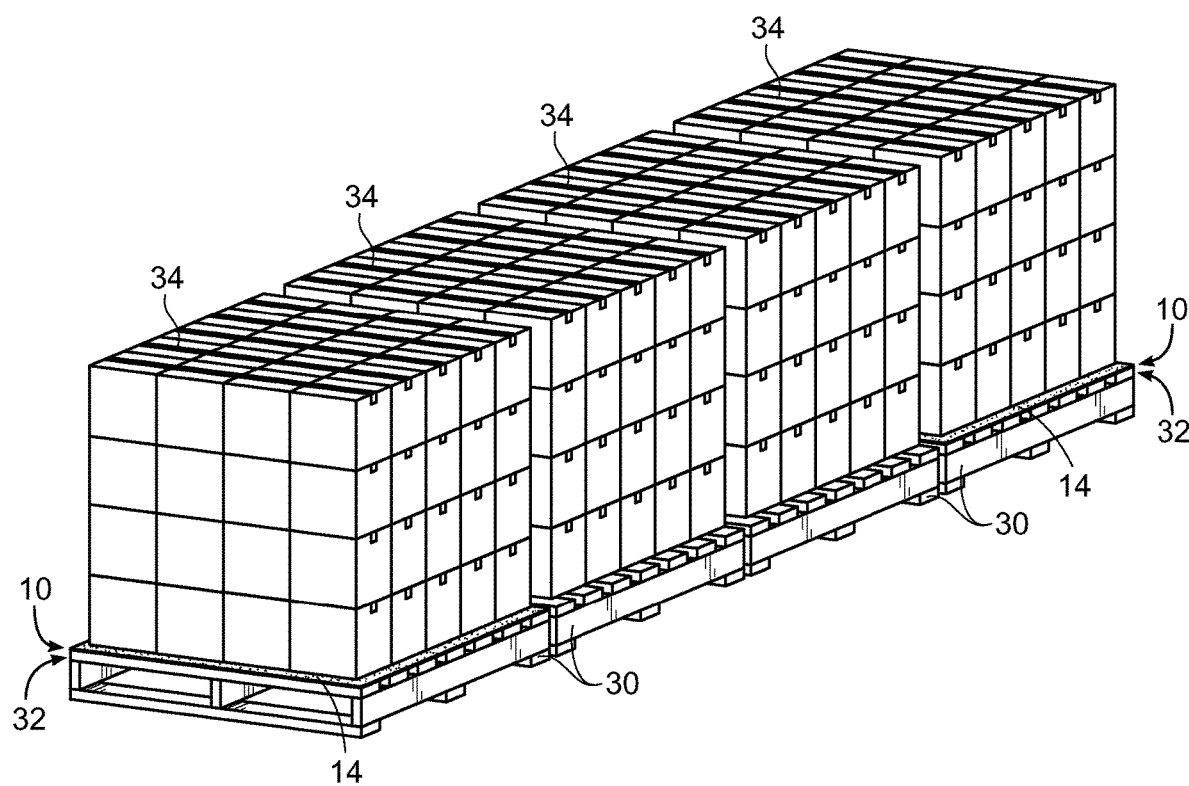
FIG. 6 is another perspective view of several pest-repellent pallet slip sheets in use, in accordance with an example embodiment.

If the pallets 30 are placed side-by-side, as shown in FIG. 6, a slip sheet 10 will protect not only the pallet 30 that it is on, but will also tend to protect adjacent pallets. In this illustration, the pallets 30 on the ends have slip sheets 10, while the middle two do not, and the end pallets will tend to protect the middle pallets due to the physical barrier of the slip sheets 10 and also due to the pest-repellent substance 20 on the slip sheets. For example, due to the tendency of the pest-repellent substance 20 to repel rodents and other pests and keep them a certain distance away from the treated portion of the slip sheets, any pallets having slip sheets 10 can further serve to discourage or repel pests from approaching pallets in proximity to those having slip sheets 10. Further, any number of pallets having slip sheets 10 may be used to create a pest-repellent perimeter around pallets or other materials within the perimeter. As an example, a number of pallets arranged in a square or rectangle may be used to create such a perimeter. In addition, even if one or number of pallets around the perimeter do not have slip sheets 10, the overall repellent effect of the remaining pallets around a group of pallets will still tend to repel pests from any untreated pallets.

Figure 7:
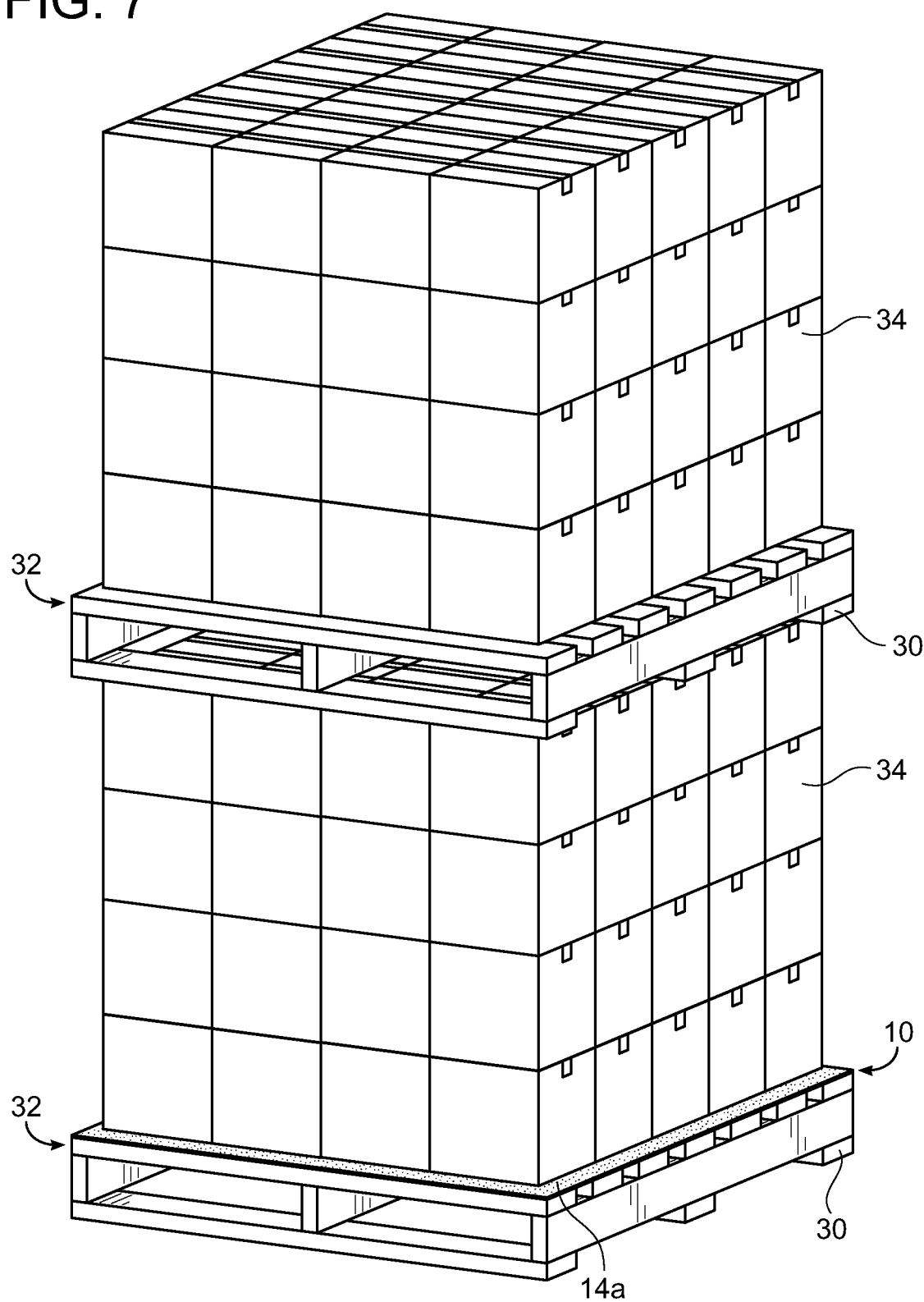
FIG. 7 is another perspective view of a pest-repellent pallet slip sheet in use, in accordance with an example embodiment.

To this end, the pattern of FIGS. 1-4 may be used, as it includes a pattern around the entire perimeter of the slip sheet 10, and thus protects the entire perimeter of the pallet 30. FIG. 5 illustrates this embodiment with a product 34 on the pallet, and also illustrates how the entire exposed portion of slip sheet 10 is treated (in this example pattern), even though the entire sheet may not be. Of course, other patterns or slip sheets that are entirely treated (e.g., coated or infused) with substance 20 may also be used to create this proximity repellent effect. Similarly, pest-repellent slip sheets 10 on lower pallets 30 will also protect pallets 30 stacked above them, as shown in FIG. 7, even though the upper pallets may not be treated. Of course, this principle also applies in the event that the other, proximate pallets (such as pallets stacked above other pallets) are provided with treated slip sheets 10. Other treatment patterns may also serve this purpose, such as that of FIGS. 9-13.

Unless otherwise defined, all technical and scientific terms used herein have the same meaning as commonly understood by one of ordinary skill in the art to which this invention belongs. Although methods and materials similar to or equivalent to those described herein can be used in the practice or testing of the pest-repellent pallet slip sheets, suitable methods and materials are described above. All publications, patent applications, patents, and other references mentioned herein are incorporated by reference in their entirety to the extent allowed by applicable law and regulations. The pest-repellent pallet slip sheets may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A rodent-repellent pallet slip sheet, comprising:
   a rectangular slip sheet comprising paper, sized and shaped for placement on a top portion of a pallet; and
   a rodent-repellent substance comprising an oil and a colored dye applied to the slip sheet in a pattern, such that a patterned portion of the slip sheet is treated with the rodent-repellent substance;
   wherein the rodent-repellent substance is infused in the slip sheet;
   wherein the pattern comprises a box shape around a perimeter of the slip sheet and wherein the pattern covers less than 20% of the slip sheet; and
   wherein the slip sheet is adapted to create a barrier between the pallet and a product on the pallet.

* * * * *